(12) United States Patent
Pedersen

(10) Patent No.: US 8,566,797 B2
(45) Date of Patent: Oct. 22, 2013

(54) HEURISTIC BACKTRACER

(75) Inventor: Soren Sandmann Pedersen, Nashua, NH (US)

(73) Assignee: Red Hat, Inc., Raleigh, NC (US)

( * ) Notice: Subject to any disclaimer, the term of this patent is extended or adjusted under 35 U.S.C. 154(b) by 1436 days.

(21) Appl. No.: 12/072,880

(22) Filed: Feb. 27, 2008

(65) Prior Publication Data

US 2009/0217006 A1 Aug. 27, 2009

(51) Int. Cl.
*G06F 9/44* (2006.01)
(52) U.S. Cl.
USPC .......................................... 717/128
(58) Field of Classification Search
USPC .............. 717/101–178; 712/1–300; 713/187; 709/217; 345/419–522; 703/22; 718/100
See application file for complete search history.

(56) References Cited

U.S. PATENT DOCUMENTS

| | | | | |
|---|---|---|---|---|
| 5,317,740 A * | 5/1994 | Sites | | 717/129 |
| 5,535,331 A * | 7/1996 | Swoboda et al. | | 714/45 |
| 5,911,060 A * | 6/1999 | Elliott | | 718/100 |
| 6,151,569 A * | 11/2000 | Elliott | | 703/22 |
| 6,167,506 A * | 12/2000 | Witt | | 712/213 |
| 6,289,444 B1 * | 9/2001 | Nair | | 712/243 |
| 6,314,514 B1 * | 11/2001 | McDonald | | 712/239 |
| 6,721,941 B1 * | 4/2004 | Morshed et al. | | 717/127 |
| 6,754,890 B1 * | 6/2004 | Berry et al. | | 717/128 |
| 6,760,903 B1 * | 7/2004 | Morshed et al. | | 717/130 |
| 6,769,004 B2 * | 7/2004 | Barrett | | 1/1 |
| 7,093,081 B2 * | 8/2006 | DeWitt et al. | | 711/144 |
| 7,114,036 B2 * | 9/2006 | DeWitt, Jr. et al. | | 711/141 |
| 7,511,712 B1 * | 3/2009 | Johns et al. | | 345/522 |
| 7,533,371 B1 * | 5/2009 | Johns et al. | | 717/130 |
| 7,581,089 B1 * | 8/2009 | White | | 712/242 |
| 7,636,745 B1 * | 12/2009 | Detlefs | | 1/1 |
| 7,971,032 B2 * | 6/2011 | Shattuck | | 712/209 |
| 8,127,280 B2 * | 2/2012 | Thomas et al. | | 717/136 |
| 2003/0005414 A1 * | 1/2003 | Elliott et al. | | 717/128 |
| 2003/0154464 A1 * | 8/2003 | Ullmann et al. | | 717/130 |
| 2003/0217277 A1 * | 11/2003 | Narayanan | | 713/187 |
| 2004/0083460 A1 * | 4/2004 | Pierce | | 717/131 |
| 2005/0155019 A1 * | 7/2005 | Levine et al. | | 717/127 |
| 2007/0033385 A1 * | 2/2007 | Smaus et al. | | 712/242 |
| 2007/0150868 A1 * | 6/2007 | Wu et al. | | 717/124 |
| 2008/0072213 A1 * | 3/2008 | Elliott et al. | | 717/128 |
| 2008/0098365 A1 * | 4/2008 | Kumar | | 717/131 |
| 2008/0288926 A1 * | 11/2008 | Cain et al. | | 717/128 |
| 2009/0089764 A1 * | 4/2009 | Lai et al. | | 717/143 |

* cited by examiner

*Primary Examiner* — Lewis A Bullock, Jr.
*Assistant Examiner* — Franciso Aponte
(74) *Attorney, Agent, or Firm* — Lowenstein Sandler LLP

(57) ABSTRACT

A heuristic backtracer is described. In one embodiment, a scanner scans a stack of an application for a pointer to a word of a machine code of the application. A preceding byte locator identifies one or more bytes immediately preceding the pointed-to machine code. A parser parses the one or more bytes immediately preceding the pointed-to machine code of the machine code for a call instruction. A return address identifier determines the pointed-to as a return address when the one or more bytes constitute the call instruction.

20 Claims, 4 Drawing Sheets

HEURISTIC BACKTRACER

TECHNICAL FIELD

Embodiments of the present invention relate to computing systems, and more particularly, to call tracing.

BACKGROUND

In computing and operating systems, a stack trace (also called stack backtrace or stack traceback) is a report of the active stack frames instantiated by the execution of a program. Stack traces are commonly used to aid debugging by showing where exactly an error occurs. The last few stack frames often indicate the origin of the bug.

One way to generate a backtrace of an application is to scan the stack of the application and list all the words that look like they could be return addresses. If the word is the address of a location in the machine code of the application, then it's likely that the word is a return address. However, this method of generating stack traces has the problem that it will generate false positives whenever a word on the stack happens to look like a code pointer. Therefore, what is needed is a method to reduce the number of false positives by eliminating some words that cannot be return addresses.

BRIEF DESCRIPTION OF THE DRAWINGS

The present invention is illustrated by way of example, and not by way of limitation, in the figures of the accompanying drawings and in which.

DETAILED DESCRIPTION

Described herein is a method and apparatus for heuristic backtracing. In one embodiment, a scanner scans a stack of an application for a pointer to a word of a machine code of the application. A preceding byte locator identifies one or more bytes immediately preceding the pointed-to machine code. A parser parses the one or more bytes immediately preceding the pointed-to machine code for a call instruction. A return address identifier determines whether the one or more bytes constitutes a call instruction.

Figure 1:
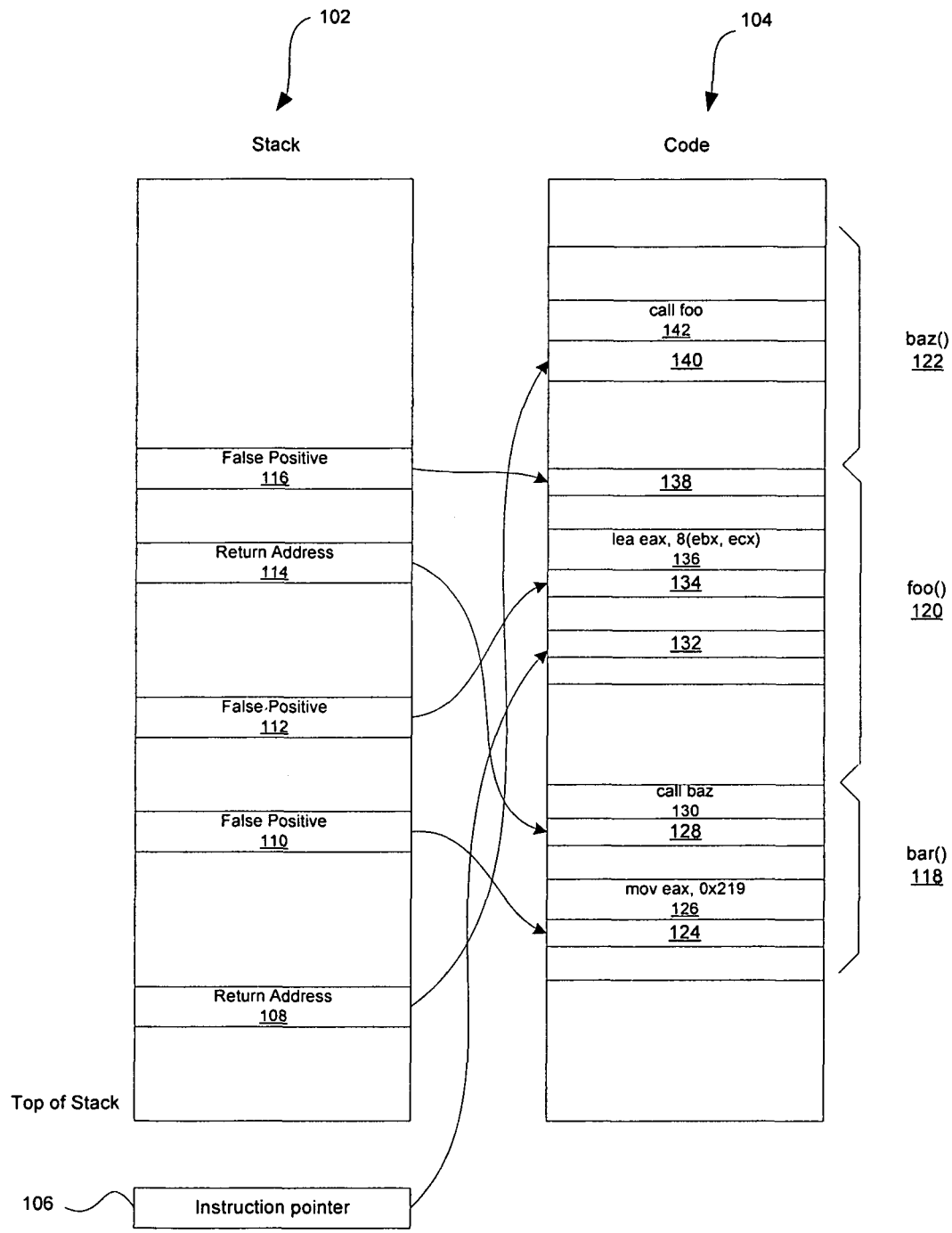
FIG. 1 is a block diagram illustrating an example of a call stack with a corresponding machine code.

FIG. 1 is a block diagram illustrating an example of a call stack 102 with a corresponding machine code 104 of a software application. Heuristic backtracing works by scanning the stack from the top down. Whenever a pointer into the machine code 104 segment is found, the one or more bytes immediately preceding the word pointed to, are parsed. If the bytes constitute a call instruction, the pointed-to address is considered a return address and included in the backtrace. If the bytes include some other instruction or cannot be parsed, the address is then not included in the backtrace.

To generate a backtrace in the example shown in FIG. 1, the address from the instruction pointer machine register 106 is first added to the backtrace. In this case, the instruction pointer machine register 106 points into the "foo" function 120. Thus "foo" function 120 is also included in the backtrace. Then, call stack 102 is then scanned for pointers into code segment 104.

The next address in stack 108 with a pointer points to address 140 of the "baz" function 122. Byte 142 immediately preceding the pointed-to address 140 is parsed to reveal that the instruction in byte 142 is "call foo". As such, the pointed-to address 140 is considered a return address and the "baz" function 122 is included in the backtrace.

The next code pointer is in stack 110 which points into address 124 of a "bar" function 118. The preceding instruction 126 to the pointed-to address 124 is "mov eax, 0x219", which is not a call instruction. As such, "bar" function 118 is not included in the backtrace.

The next code pointer is in stack 112 which points into address 134 of "foo" function 120. The preceding instruction 136 to the pointed-to address 134 is "lea eax, 8(ebx,ecx)", which is also not a call instruction. As such, "foo" function 120 is not included in the backtrace.

The next code pointer is in stack 114 which points into address 128 of "bar" function 118. The preceding instruction 130 to the pointed-to address 128 is "call baz", which is a call instruction. As such, "bar" function 118 is included in the backtrace.

Finally, the next code pointer is in stack 116 which points exactly to the beginning 138 of "foo" function 120. This is a false positive because the beginning 138 of a function can never be a return address as known in the art.

Figure 2:
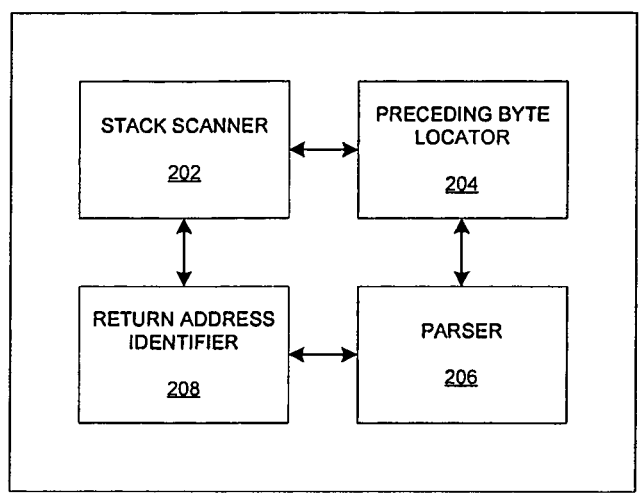
FIG. 2 is a block diagram illustrating one embodiment of a heuristic backtracer.

FIG. 2 is a block diagram illustrating one embodiment of a heuristic backtracer 200. In one embodiment, the backtracer 200 includes a stack scanner 202, a preceding byte locater 204, a parser 206, and a return address identifier 208. Stack scanner 202 scans a stack of an application for a pointer to a machine code of an application. Preceding byte locater 204 identifies a bytes one or more immediately preceding the pointed-to machine code. Parser 206 parses the bytes for a call instruction. Return address identifier 208 determines the pointed-to machine code as a return address when the bytes includes a call instruction.

In another embodiment, return address identifier 208 includes the pointed-to machine code as the return address in a backtrace of the application and omits the pointe-to machine code as the return address in the backtrace when the bytes does not constitute the call instruction.

In another embodiment, stack scanner 202 determines an address from which an instruction pointer machine register of the stack of the application points to, and includes that address in the backtrace of the application.

Figure 3:
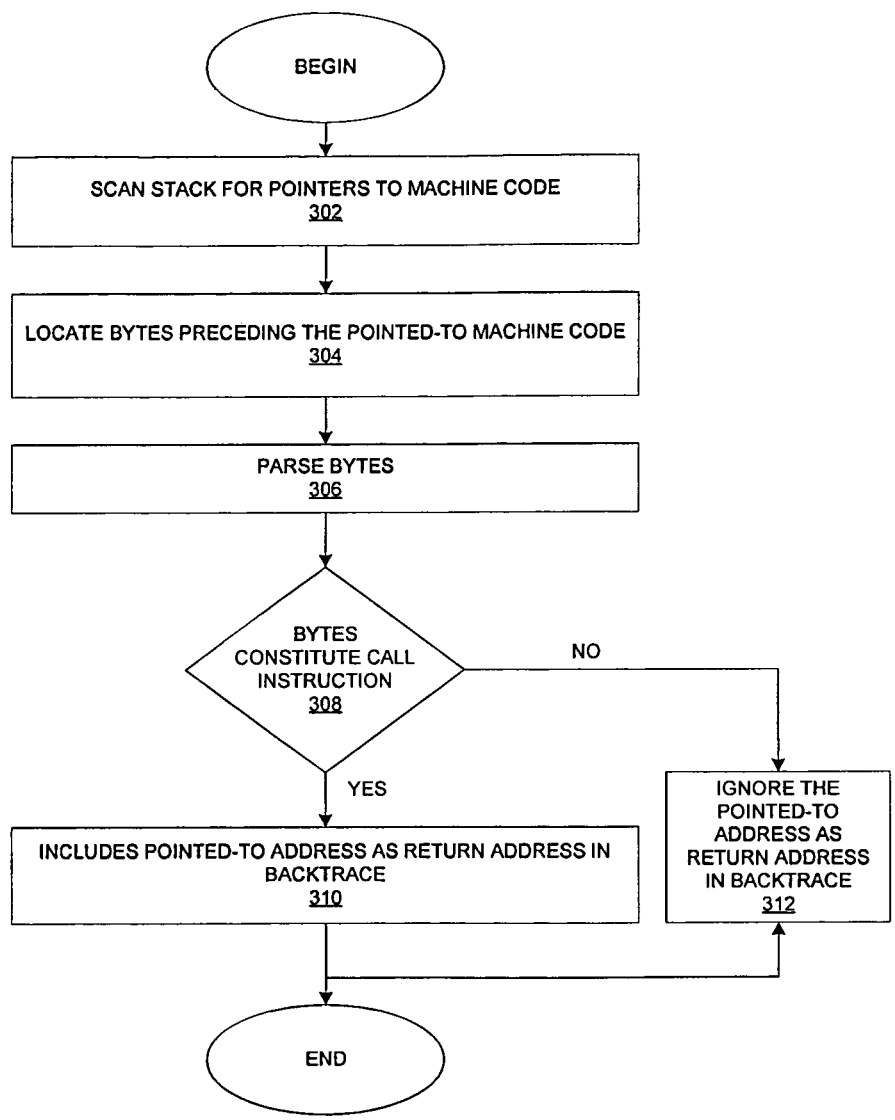
FIG. 3 is a flow diagram illustrating one embodiment of a method for call tracing.

FIG. 3 is a flow diagram illustrating one embodiment of a method for call tracing or backtracing. At 302, a stack scanner scans a stack of an application for a pointer to a word of a machine code of the application. At 304, the bytes immediately preceding the word of the machine code is located. At 306, that located bytes is parsed for a call instruction. At 308, a determination is made as to whether the bytes includes a call instruction. At 310, if the located bytes includes a call instruction, the pointed-to address of that located bytes is included as a return address in the backtrace of the application. At 312, if the located bytes does not constitute a call instruction, the pointed-to address of that located bytes is not included as a return address in the backtrace of the application.

In another embodiment, when the pointed-to address is located at the beginning of a function, that function is not included in the backtrace of the application.

Figure 4:
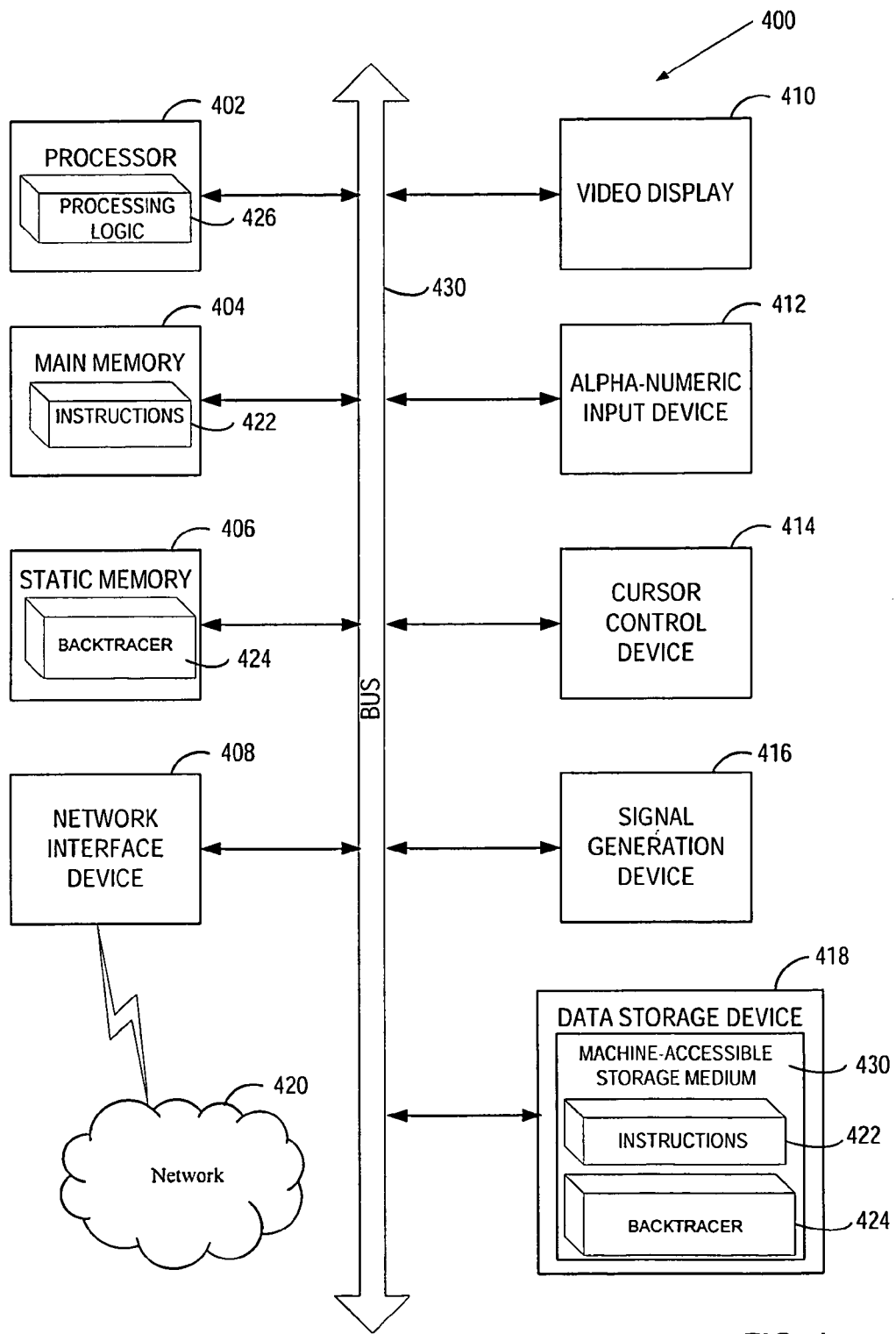
FIG. 4 is a block diagram illustrating an example of a computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM), a static memory 406 (e.g., flash memory, static random access memory (SRAM), etc.), and a data storage device 418, which communicate with each other via a bus 430.

Processing device 402 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 430 on which is stored one or more sets of instructions (e.g., software 422) embodying any one or more of the methodologies or functions described herein. The software 422 may also reside, completely or at least partially, within the main memory 404 and/or within the processing device 402 during execution thereof by the computer system 400, the main memory 404 and the processing device 402 also constituting machine-accessible storage media. The software 422 may further be transmitted or received over a network 420 via the network interface device 408.

The machine-accessible storage medium 430 may also be used to store a backtracer 424 as presently described. The backtracer 424 may also be stored in other sections of computer system 400, such as static memory 406.

While the machine-accessible storage medium 430 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

Compared to non-heuristic back-tracing based on DWARF (a debugging tool commonly known to those of ordinary skills in the art, heuristic back-tracing has the advantage that it performs better and is much simpler to implement. The present invention improves the quality of such backtraces so that they are more likely to be a useful alternative. Another drawback of non-heuristic backtracing is using framepointers which does not work in all cases.

Compared to the idea of rejecting pointers to the beginning functions, the present invention eliminates more false positives since it will reject pointers to places in the middle of a function which can never be a return address in addition to pointers to the beginning of functions.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    scanning a stack of an application for pointers into a machine code of the application;
    upon identifying in the machine code a pointer to a word associated with a function of the application, locating a byte immediately preceding the word in the machine code;
    parsing the preceding byte for an instruction;
    determining, via a processing device, whether the instruction in the preceding byte is a call instruction for the function;
    when the instruction in the preceding byte is not the call instruction for the function, determining that the word is not a return address for the function, and refraining from including the function in a backtrace of the application; and
    when the instruction in the preceding byte is the call instruction for the function, determining that the word is the return address for the function, and including the function in the backtrace of the application.

2. The method of claim 1, further comprising:
    including the word of the machine code as the return address in the backtrace of the application.

3. The method of claim 2, further comprising:
    omitting the word of the machine code as the return address in the backtrace when the byte does not include the call instruction.

4. The method of claim 3, further comprising:
    omitting the word of the machine code as the return address in the backtrace when the byte is located at a beginning of the function.

5. The method of claim 1, further comprising:
    determining an address that an instruction pointer machine register points to; and
    including the address in the backtrace of the application.

6. A non-transitory computer-readable storage medium having stored therein instructions which, when executed by a processing device, cause the processing device to perform a method comprising:
    scanning a stack of an application for pointers into a machine code of the application;
    upon identifying in the machine code a pointer to a word associated with a function of the application, locating a byte immediately preceding the word in the machine code;
    parsing the preceding byte for an instruction;
    determining whether the instruction in the preceding byte is a call instruction for the function;
    when the instruction in the preceding byte is not the call instruction for the function, determining that the word is not a return address for the function, and refraining from including the function in a backtrace of the application; and
    when the instruction in the preceding byte is the call instruction for the function, determining that the word is the return address for the function, and including the function in the backtrace of the application.

7. The non-transitory computer-readable storage medium of claim 6, wherein the method further comprises:
    including the word of the machine code as the return address in the backtrace of the application.

8. The non-transitory computer-readable storage medium of claim 7, wherein the method further comprises:
    omitting the word of the machine code as the return address in the backtrace when the byte does not include the call instruction.

9. The non-transitory computer-readable storage medium of claim 8, wherein the method further comprises:
    omitting the word of the machine code as the return address in the backtrace when the byte is located at a beginning of the function.

10. The non-transitory computer-readable storage medium of claim 6, wherein the method further comprises:
    determining an address that an instruction pointer machine register points to; and
    including the address in the backtrace of the application.

11. A backtracer comprising:
    a processing device;
    a scanner executed by the processing device to scan a stack of an application pointers into a machine code of an application;
    a pointer tracer coupled to the scanner to identify in the machine code a pointer to a word associated with a function of the application;
    a preceding byte locator coupled to the scanner to identify a byte immediately preceding the word in the machine code;
    a parser coupled to the preceding byte locator to parse the preceding byte for an instruction; and
    a return address identifier coupled to the parser to:
    determine whether the instruction in the preceding byte is a call instruction for the function;
    when the instruction in the preceding byte is not the call instruction for the function, determine that the word is not a return address for the function, and refrain from including the function in a backtrace of the application; and
    when the instruction in the preceding byte is the call instruction for the function, determine that the word is the return address for the function, and include the function in the backtrace of the application.

12. The backtracer of claim 11, wherein the return address identifier includes the word of the machine code as the return address in the backtrace of the application.

13. The backtracer of claim 12, wherein the return address identifier omits the word of the machine code as the return address in the backtrace when the byte does not include the call instruction.

14. The backtracer of claim 13, wherein the return address identifier omits the word of the machine code as the return address in the backtrace when the byte is located at a beginning of the function.

15. The backtracer of claim 11, wherein the scanner determines an address that an instruction pointer machine register points to, and includes the address in the backtrace of the application.

16. A computing system comprising:
   a memory to store a stack and a machine code of an application;
   a processor coupled to the memory to process the machine code; and
   a backtracer coupled to the processor
      to scan the stack for pointers into the machine code,
      to identify in the machine code a pointer to a word associated with a function of the application,
      to locate a byte immediately preceding the word in the machine code,
      to parse the preceding byte for an instruction,
      to determine whether the instruction in the preceding byte is a call instruction for the function,
      when the instruction in the preceding byte is not the call instruction for the function, to determine that the word is not a return address for the function, and to refrain from including the function in a backtrace of the application, and
      when the instruction in the preceding byte is the call instruction for the function, to determine that the word is the return address for the function, and to include the function in the backtrace of the application.

17. The computing system of claim 16, wherein the backtracer includes the word of the machine code as the return address in the backtrace of the application.

18. The computing system of claim 17, wherein the backtracer omits the word of the machine code as the return address in the backtrace when the byte does not include the call instruction.

19. The computing system of claim 18, wherein the backtracer omits the word of the machine code as the return address in the backtrace when the byte is located at a beginning of the function.

20. The computing system of claim 16, wherein the backtracer determines an address that an instruction pointer machine register points to, and includes the address in the backtrace of the application.

* * * * *